UNITED STATES PATENT OFFICE.

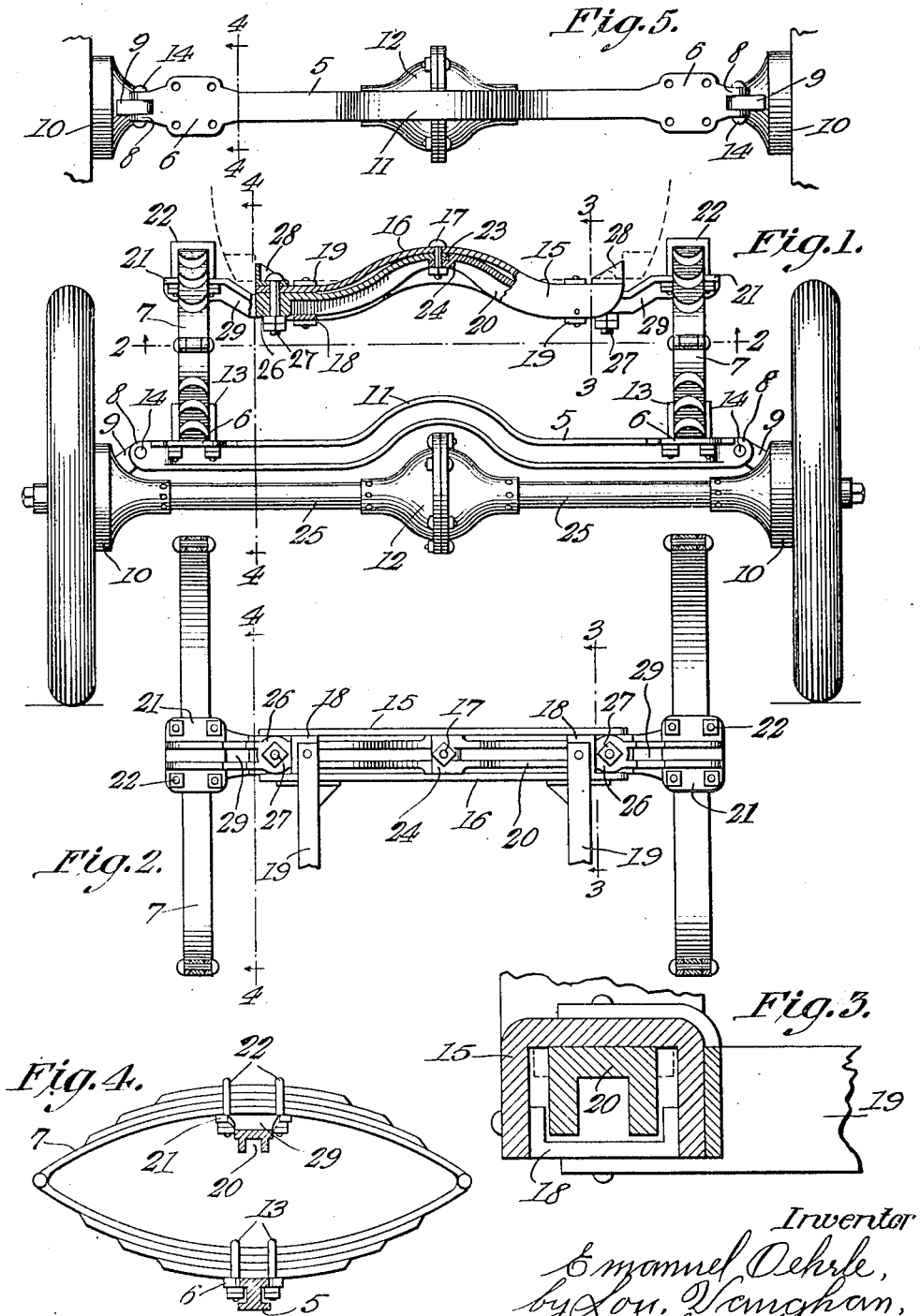

EMANUEL OEHRLE, OF OMAHA, NEBRASKA, ASSIGNOR OF ONE-HALF TO JOHN J. FUCHS, OF OMAHA, NEBRASKA.

COMBINED VEHICLE SPRING CONNECTION AND AXLE-BRACE.

1,286,073.   Specification of Letters Patent.   Patented Nov. 26, 1918.

Application filed January 13, 1917, Serial No. 142,261. Renewed April 2, 1918. Serial No. 226,299.

*To all whom it may concern:*

Be it known that I, EMANUEL OEHRLE, a citizen of the United States of America, residing at Omaha, in the State of Nebraska, have invented a new and useful Combined Vehicle Spring Connection and Axle-Brace, of which the following is a specification.

My invention relates to an axle brace and a connecting device whereby longitudinally disposed or side springs may be substituted for cross-springs such as are generally disposed in alinement with and above the axle; and the objects of my improvement are, first, to relieve the axle, or axle housing, as ordinarily mounted on automobiles, from sudden intermediate loads or shocks caused by breakage of springs; second, to reinforce the axle or housing to resist the regular vertical load and to distribute the sidewise strain equally to both ends of the axle or housing, when the vehicle and load is tilted laterally by sideling roads or when either wheel is suddenly obstructed in its sidewise slide on the ground when skidding; third, to provide a bottom seat and connection for the side springs without changing the regular spring perches or spring attaching structure of the axle; and, fourth, to provide a sub-frame cross member or sub-bolster that will seat in or against the regular frame cross member or bolster, without disturbing its attachment to the frame of the vehicle or in any manner materially modifying the retained parts of the structure. I can best disclose my contrivance by showing it applied to the rear axle housing and hind frame bolster of the latest type of Ford automobile. To this end, the structural mechanism by which I attain the above mentioned objects is illustrated by the accompanying drawing, in which—

Figure 1 is a rear elevation of the complete device attached to the hind axle housing and rear bolster of an automobile, a part of the regular bolster and sub-bolster being cut away and shown in section; Fig. 2, an underside view of the upper part, taken on the broken line 2 of Fig. 1; Fig. 3, an enlarged scale cross-section on the broken lines 3 and 3 of Figs. 1 and 2; Fig. 4, a cross-section on the broken lines 4, of Figs. 1, 2 and 5; and Fig. 5, is a top view of the axle brace and lower spring support bar, fastened in position above the automobile hind axle housing, the springs being removed.

Throughout all of the views similar reference numerals indicate like parts of the device.

An I beam or bar 5, has near its ends, its top flanges widened to form the support seats 6 and 6 for the bottoms of the elliptic side springs 7 and 7. This bar has its web divided vertically to form the forked ends 8 to engage the regular spring-perches 9 on the housing plates 10 at the ends of the axle housing 25. A central portion of the I bar is bent upwardly to form the arch 11 clearing the differential housing or casing 12 at the center of the axle. The spring-support seats are perforated to take the spring clips 13 by which the bottom halves of the full elliptic side springs are secured on the seats. The forked ends are secured to the perches by the pins 14, whereby the I bar forms a rigid brace or top chord of a truss of which the axle or axle housing is the bottom chord.

Particularly citing the old or regular members of the car structure to which the new is attached:—The rear cross member or bolster 15 of the frame is made from a channel bar disposed with the gutter downward to receive the curved top of a half elliptic cross spring. This frame bolster has a central upward bend 16 corresponding, in position, with the top of the cross spring and a central vertical bolt 17 whereby the top of this cross spring is secured in the gutter of the channel. The enlarged cross-section of this frame bolster, shown in Fig. 3, shows the bridge or brace 18 spanning the lower edges of the flanges as a brace and attaching plate to facilitate attaching the hind end of the side member 19 of the car frame.

For a top connection, for the substituted full elliptic side springs 7 and 7, to the frame bolster, described above, I supply a sub-bolster 20 disposed throughout the channel or gutter of the frame bolster. It is of inverted channel shape, like the frame bolster, and its projecting ends are disposed through the full elliptic springs at each side. These ends are widened at the top by the laterally disposed flanges 21 which have holes to receive the spring clips 22 by which the widened ends of the sub-bolster are secured to the under sides of the top halves of the substituted full elliptic springs. As the widened ends of this sub-bolster cannot be inserted through the narrow space above the brace plate 18 at the end of the frame bolster,—see Fig. 3,—the sub-bolster is made in end halves. One of these halves has at its inner end an extended overlap 23 of the plate or web of the channel and the opposite half has a corresponding underlap 24 shaped on its inner end; these laps, like the web of the frame bolster on top of them, are perforated to receive the vertical attaching bolt 17. These lapped ends are widened to quite fill in width the gutter of the frame bolster to prevent any lateral shift on the central attaching bolt. The sub-bolster also has the enlarging bosses 26, in each half, disposed just within the ends of the frame-bolster and bored to receive the vertical bolts 27 and 27 that secure the body-attaching brackets 28 on top of the ends of the frame bolster. That part of each half disposed between the points of attachment is narrower and of different curvature from the frame bolster, so that the sub-bolster has no bearing therein except at the three points of attachment, the center and the ends; and being of less vertical height than the space between the braces 18 and the web or top plate of the frame bolster, gives ample clearance for the insertion therein of these halves of the sub-bolster. And a portion 29 of each half, between the end of the frame bolster and the spring, is bent vertically to bring the car frame to a desired altitude above the axle.

Any lateral force applied at the bottom of either wheel, by either skidding or sideling roads, producing a strain in a vertical plane agreeing with the axis of the axle housing, will obviously be equally divided to each end of the axle housing; either by tensional or compressive strain in the rigid I bar 5, securely attached to the perches 9 which are rigidly set in the tops of the ends of the housing.

I claim:

1. A device of the character described, comprising an axle housing, rigid perches disposed to stand upwardly on the ends of the housing, and a rigid bar disposed parallelly with and spaced above said housing and having its ends fastened to said perches.

2. A device of the character described, comprising an axle housing, rigid upwardly standing perches on the ends of said housing, a rigid bar spaced away from said housing, to span the space between said perches and having its ends fastened thereto, and a support seat for a spring on said bar.

3. A device of the character described, comprising an axle housing having an enlargement to form a differential casing, an upstanding perch on each end of the housing, a rigid bar spaced above and away from said housing and having a bend to clear said casing and its ends fastened to said perches, and support seats for springs on said bar.

4. A device of the character described, comprising an axle housing, a perch on each end of the housing, a rigid bar having its ends fastened to said perches, springs fastened on top of said bar adjacent to its ends, a vehicle frame bolster shorter than the space between said springs, and a sub-bolster of greater length fastened to said frame bolster and having its projecting ends fastened to the tops of said springs.

5. In a device of the character described, a vehicle frame bolster composed of a channel bar having near its ends braces disposed across its channel and spaced from the bottom of said channel to form openings, in combination with a sub-bolster of greater length and made of separable halves with a lap splice at the longitudinal center, the inner spliced ends adapted to be inserted into the channel of the frame bolster, through the said openings and the laps of the splice perforated to receive a fastening bolt disposed through the web of the frame bolster, and the outer ends of the halves widened to form attaching seats for the vehicle springs.

6. In a device of the character described, a vehicle frame bolster consisting of a bar having vehicle body-supporting brackets bolted on its ends, in combination with a sub-bolster of greater length disposed lengthwise with said frame bolster to project equally from the ends thereof and secured thereto by having bolt holes disposed to receive the bolts that secure said body brackets on the frame bolster, and the projecting ends of the sub-bolster having vertical bends to adjust the altitude of the vehicle body above the axle and adapted to be attached to the vehicle springs.

In testimony wheerof I have hereto affixed my signature.

EMANUEL OEHRLE.

Copies of this patent may be obtained for five cents each, by addressing the "Commissioner of Patents, Washington, D. C."